United States Patent [19]

Dechene

[11] Patent Number: 4,910,728

[45] Date of Patent: Mar. 20, 1990

[54] MULTIPLEXER DIAGNOSTIC INPUT PATTERNS

[75] Inventor: Joseph F. Dechene, Hartford, Conn.

[73] Assignee: United Technologies Corporation, Hartford, Conn.

[21] Appl. No.: 211,951

[22] Filed: Jun. 27, 1988

[51] Int. Cl.$^4$ ............................................. H04J 3/14
[52] U.S. Cl. ........................................ 370/13; 371/26
[58] Field of Search .......................... 370/13, 17, 112; 371/24, 25, 27, 26, 25.1

[56] References Cited

U.S. PATENT DOCUMENTS

| | | | |
|---|---|---|---|
| 3,579,199 | 5/1971 | Anderson et al. | 340/172.5 |
| 3,920,919 | 11/1975 | Aillet | 370/13 |
| 3,940,601 | 2/1976 | Henry et al. | 235/153 AC |
| 4,376,998 | 3/1983 | Abbott et al. | 370/13 |
| 4,559,626 | 12/1985 | Brown | 371/21 |
| 4,601,028 | 7/1986 | Huffman et al. | 370/13 |

OTHER PUBLICATIONS

Shenton, "Custom Design of a High Performance MOST Multiplexer" in Proceedings I.R.E.E. Australia, vol. 32, No. 6; Jun., 1971; pp. 204-213.

Primary Examiner—Douglas W. Olms
Attorney, Agent, or Firm—Richard H. Kosakowski

[57] ABSTRACT

Binary logic states (ONE, ZERO) are presented to the data inputs (24) of a multiplexer in a pattern characterized by a reversal of the binary logic states at input boundaries defined numerically as radix two raised to successive integer exponents. After sequencing the multiplexer address lines (22) to select the inputs to appear at the multiplexer output (25) in a desired sequence, the assembled output word (27) can, because of the pattern presented to the inputs, uniquely identify one of a number of particular address line conditions. Preselected codes are determined that facilitate identification of the conditions by comparing the codes to the output word in a flowchart of program steps (FIG. 4). Each code is associated with a pair of conditions, a first condition with a comparison result of all ONEs and a second with a comparison result of zero.

15 Claims, 6 Drawing Sheets

BEGIN

|  | HEX CODE | RESULT EQUALS ALL BINARY ONES | RESULT EQUALS ZERO |
|---|---|---|---|
|  |  | 36 | 37 | 38 |
| 62 | 6 9 9 6 | SIGNAL INVERSION | ADDRESS LINES CORRECT |
| 64 | C 3 3 C | A0 ALWAYS AT LOGIC ONE (HIGH) | A0 ALWAYS AT LOGIC ZERO (LOW) |
|  | A 5 5 A | A1 ALWAYS HIGH | A1 ALWAYS LOW |
| 66 | 9 9 6 6 | A2 ALWAYS HIGH | A2 ALWAYS LOW |
|  | 9 6 9 6 | A3 ALWAYS HIGH | A3 ALWAYS LOW |
| 68 | 0 F F 0 | A0,A1 SHORTED TO DIFFERENT LOGIC LEVELS | A0,A1 SHORTED TOGETHER OR TO SAME LOGIC LEVEL |
| 70 | 3 3 C C | A0,A2 SHORTED TO DIFFERENT LOGIC LEVELS | A0,A2 SHORTED TOGETHER OR TO SAME LOGIC LEVEL |
|  | 3 C 3 C | A0,A3 SHORTED TO DIFFERENT LOGIC LEVELS | A0,A3 SHORTED TOGETHER OR TO SAME LOGIC LEVEL |
|  | 5 5 A A | A1,A2 SHORTED TO DIFFERENT LOGIC LEVELS | A1,A2 SHORTED TOGETHER OR TO SAME LOGIC LEVEL |
|  | 5 A 5 A | A1,A3 SHORTED TO DIFFERENT LOGIC LEVELS | A1,A3 SHORTED TOGETHER OR TO SAME LOGIC LEVEL |
|  | 6 6 6 6 | A2,A3 SHORTED TO DIFFERENT LOGIC LEVELS | A2,A3 SHORTED TOGETHER OR TO SAME LOGIC LEVEL |
|  | F F 0 0 | A0,A1,A2 ALL SHORTED HIGH OR ONE SHORTED HIGH AND TWO SHORTED LOW | A0,A1,A2 ALL SHORTED LOW OR TWO SHORTED HIGH AND ONE SHORTED LOW |
|  | F 0 F 0 | A0,A1,A3 ALL SHORTED HIGH OR ONE SHORTED HIGH AND TWO SHORTED LOW | A0,A1,A3 ALL SHORTED LOW OR TWO SHORTED HIGH AND ONE SHORTED LOW |

FROM FIG.2A

| HEX CODE | RESULT EQUALS ALL BINARY ONES | RESULT EQUALS ZERO |
|---|---|---|
| C C C C | A0,A2,A3 ALL SHORTED HIGH OR ONE SHORTED HIGH AND TWO SHORTED LOW | A0,A2,A3 ALL SHORTED LOW OR TWO SHORTED HIGH AND ONE SHORTED LOW |
| A A A A | A1,A2,A3 ALL SHORTED HIGH OR ONE SHORTED HIGH AND TWO SHORTED LOW | A1,A2,A3 ALL SHORTED LOW OR TWO SHORTED HIGH AND ONE SHORTED LOW |
| 7 F 8 0 (LOW WINS) | UNDIAGNOSED ERROR | A0,A1,A2 SHORTED TOGETHER |
| 0 1 F E (HIGH WINS) | UNDIAGNOSED ERROR | A0,A1,A2 SHORTED TOGETHER |
| 1 7 E 8 (MAJORITY WINS) | UNDIAGNOSED ERROR | A0,A1,A2 SHORTED TOGETHER |
| 7 8 F 0 (LOW WINS) | UNDIAGNOSED ERROR | A0,A1,A3 SHORTED TOGETHER |
| 0 F 1 E (HIGH WINS) | UNDIAGNOSED ERROR | A0,A1,A3 SHORTED TOGETHER |
| 1 E 7 8 (MAJORITY WINS) | UNDIAGNOSED ERROR | A0,A1,A3 SHORTED TOGETHER |
| 6 C C C (LOW WINS) | UNDIAGNOSED ERROR | A0,A2,A3 SHORTED TOGETHER |
| 3 3 3 6 (HIGH WINS) | UNDIAGNOSED ERROR | A0,A2,A3 SHORTED TOGETHER |
| 3 6 6 C (MAJORITY WINS) | UNDIAGNOSED ERROR | A0,A2,A3 SHORTED TOGETHER |

| HEX CODE | RESULT EQUALS ALL BINARY ONES | RESULT EQUALS ZERO |
|---|---|---|
| 6 A A A (LOW WINS) | UNDIAGNOSED ERROR | A1,A2,A3 SHORTED TOGETHER |
| 5 5 5 6 (HIGH WINS) | UNDIAGNOSED ERROR | A1,A2,A3 SHORTED TOGETHER |
| 5 6 6 A (MAJORITY WINS) | UNDIAGNOSED ERROR | A1,A2,A3 SHORTED TOGETHER |
| 0 0 0 0 | ONE ADDRESS LINE SHORTED HIGH AND THREE SHORTED LOW OR THREE SHORTED HIGH AND ONE SHORTED LOW | A0 – A3 ALL SHORTED HIGH OR LOW OR TWO SHORTED HIGH AND TWO SHORTED LOW |
| X X X X | UNDIAGNOSED ERROR | |

FIG.2C

| FIG. 2A |
|---|
| FIG. 2B |
| FIG. 2C |

FIG.2

MULTIPLEXER DIAGNOSTIC INPUT PATTERNS

DESCRIPTION

1. Technical Field

This invention relates to testing of multiplexers, and more particularly to such testing having the ability to diagnose problems with the multiplexer address lines.

2. Background Art

In the prior art of multiplexer testing, there are various known test patterns of binary logic states (ONE, ZERO) that are applied to the data inputs (inputs) of the multiplexer (mux) to facilitate testing. Included among these patterns are all ONEs, all ZEROs, alternating ONEs and ZEROs, alternating ZEROs and ONEs, walking ONEs, and walking ZEROs. These test patterns are also used for testing semiconductor memory devices, as illustrated in U.S. Pat. No. 4,559,626. In testing multiplexers with any of these patterns, the desired pattern is applied to the inputs and the multiplexer address lines are sequenced to pass the selected input to the multiplexer output. The time division multiplexed output pattern is then compared to the input pattern for discrepancies.

The test patterns enumerated in the foregoing are limited in that they cannot diagnose individual multiplexer address line faults, such as short circuits to either positive DC volts or zero DC volts, or short circuits between two address lines. Thus, for example, if a well-known electronic integrated circuit multiplexer, such as the Texas Instruments 74C150, is installed in a printed circuit board along with other components, the trouble shooting personnel can spend extra time probing for the source of the problem because the foregoing test patterns will not diagnose problems with the address lines. It is also possible that components other than the multiplexer may be erroneously replaced as a result of the incomplete diagnosis. This is costly and time consuming. Also, for an example of a sixteen input multiplexer, both the walking ONEs test and the walking ZEROs test each require sixteen reads of each of sixteen inputs, a total of 256 reads. In a test of a system with many multiplexed inputs, the time it takes for these reads can become significant.

It is desirable to test multiplexers by applying a pattern of binary logic states to the inputs such that the time division multiplexed pattern read out of the multiplexer identifies problems with the multiplexer address lines, including problems occurring both interal and external to the multiplexer. It is also desirable that the multiplexer test involve a minimum number of reads to facilitate testing of a system with a large number of multiplexers.

DISCLOSURE OF INVENTION

Objects of the present invention include providing multiplexer diagnosis with distinct indicia of different multiplexer address line conditions, and reducing the steps required of multiplexer diagnosis.

According to the present invention, a method of diagnosing multiplexers applies binary logic states to the inputs of the multiplexers in a pattern generated by reversing the binary logic states on the first, second, fourth, eighth, sixteenth, etc. (i.e., radix two raised to the 0, 1, 2, 3, 4, etc., exponent) input boundaries, the input pattern having the inherent characteristic that any malfunctioning multiplexer address line causes a pattern to be read out of the multiplexer that not only is different from the pattern presented at the input, but also is sufficiently distinct to permit identification of particular address line conditions.

Other objects, features and advantages of the present invention will become more apparent in the light of the following detailed description of exemplary embodiments thereof, as illustrated in the accompany drawings.

BRIEF DESCRIPTION

FIG. 1 is a simplified illustration of a sixteen input multiplexer, to the inputs of which are applied a pattern of binary logic states that enables diagnosis of multiplexers address line conditions.

FIGS. 2A, 2B, and 2C, arranged as shown in FIG. 2, are simplified illustrations of a table comprising hexadecimal (hex, base 16 numbering system) codes that undergo an exclusive-or (XOR) operation with the multiplexer output pattern, and also comprising corresponding specific address line diagnostic information as a result of the XOR operation.

BEST MODE FOR CARRYING OUT THE INVENTION

Figure 1:
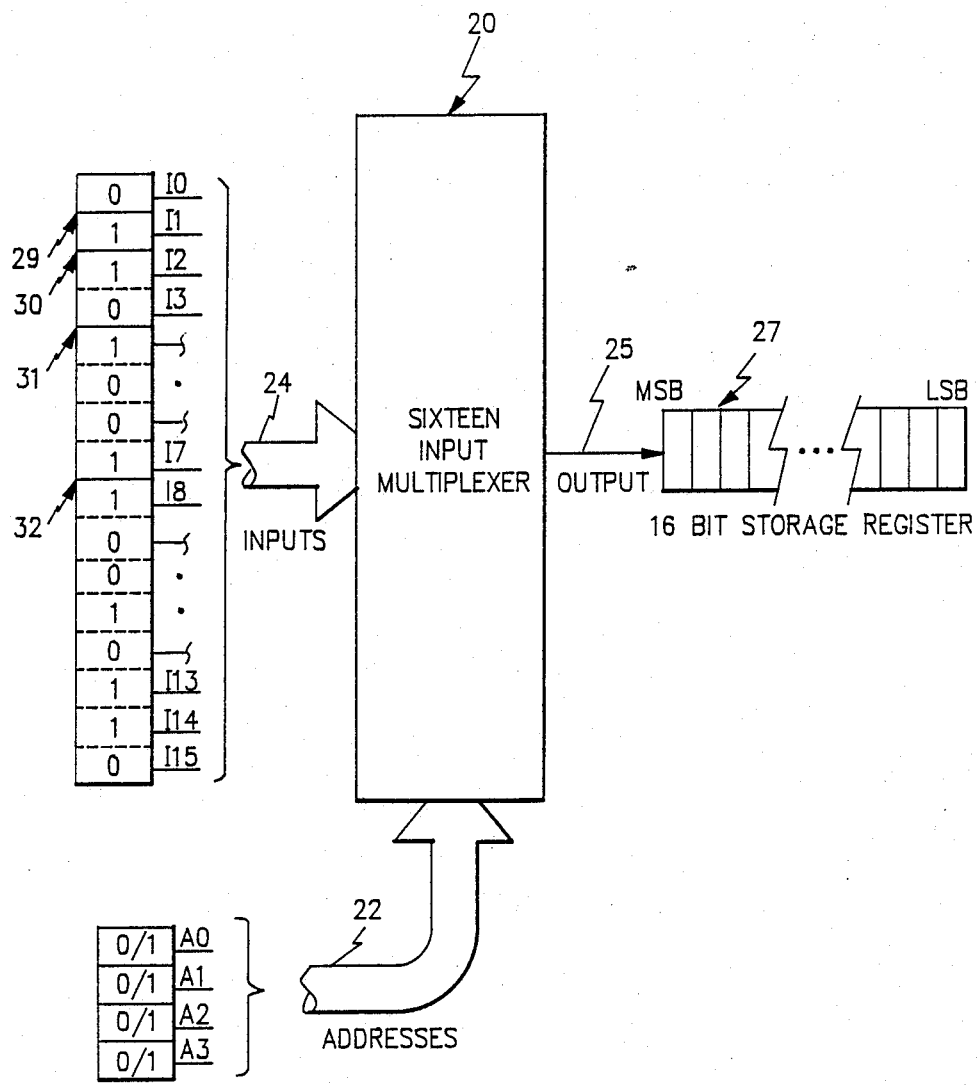

Referring to FIG. 1, in a simplified illustration of a sixteen input multiplexer 20, four address lines 22 (A0–A3) select the binary logic state on one of sixteen input lines 24 (I0–I15) to appear on a line 25 at the multiplexer output. In the test of the present invention, the address lines 22 are sequenced to select each input beginning with I0 (selected by A0–A3 equal to binary 0000 respectively), then I1 (A0–A3 equal to 1000,and continuing through I15 (A0–A3 equal to 1111). If the address lines 22 are operating correctly, the multiplexer output 25 equals the binary logic state of the desired input. However, if there are problems with the address lines 22 (e.g., one or more are shorted to +5 volts DC or zero vots DC), the multiplexer output 25 will then equal the binary logic state of an input other than the desired input. This is because the actual binary logic states on the affected address line are different from the desired states.

In general, as the address lines 22 are sequenced, the multiplexer output 25 is assembled as a sixteen bit output word 27 in a storage register (e.g., a shift register or memory location) for data manipulation. The input selected during the first sequence becomes the least significant bit (LSB) of the output word 27, while the input selected during the last sequence becomes the most significant bit (MSB) of the output word 27. In the example of FIG. 1, the multiplexer inputs 24, address lines 22, and output 25 are intended to interface with digital electronic binary logic signals, such as those of the well-known TTL family.

The pattern of binary signals applied to the inputs is determined as follows. A first input, I0, is arbitrarily chosen to be either logic ONE or ZERO. In the example of FIG. 1, logic ZERO is applied to I0. The binary logic state on a second input, I1, is reversed (i.e., logic ONE) from that of I0. Next, inputs I2 and I3 are reversed from inputs I0 and I1, respectively. Then, the pattern of logic states applied to inputs I4-I7 is reversed from that of inputs I0-I3. Finally, the pattern applied to inputs I8-I5 is reversed from the pattern applied to inputs I0-I7. For ease in understanding and manipulation, the hex equivalent of the resulting pattern of binary logic states applied to the multiplexer inputs 24 is 6996 HEX. It can be seen from the foregoing that the pattern of binary logic states applied to the multiplexer inputs 24 is determined by reversing the pattern of binary logic states applied at first 29 (I0), second 30 (I1), fourth 31 (I3), and eighth 32 (I7) (i.e., radix two raised to the 0, 1, 2, and 3 exponent) input boundaries. An inherent characteristic of this input pattern (i.e., reversing on exponents of two) is that, after the address lines are sequenced to select the inputs 24, the pattern of binary logics states in the multiplexer output word 27 bears a relation to one of a number of specific address line conditions.

FIGS. 2A, 2B, and 2C, arranged as shown in FIG. 2 and referenced collectively as FIG. 2, illustrate a table comprised, in part, of a first column 36 of hex codes. When XOR'ed with the multiplexer output word 27, each code facilitates the identification of conditions with the multiplexer address lines 22. A pair of columns 37,38 list specific conditions of the address lines 22 based on the result of the XOR operation of the output word 27 with the hexcode of the first column 36: the second column 37 indicates address line conditions when the result of the XOR operation is all binary ONEs; the third column 38 indicates address line conditions when the result of the XOR operation is zero.

Figure 3:
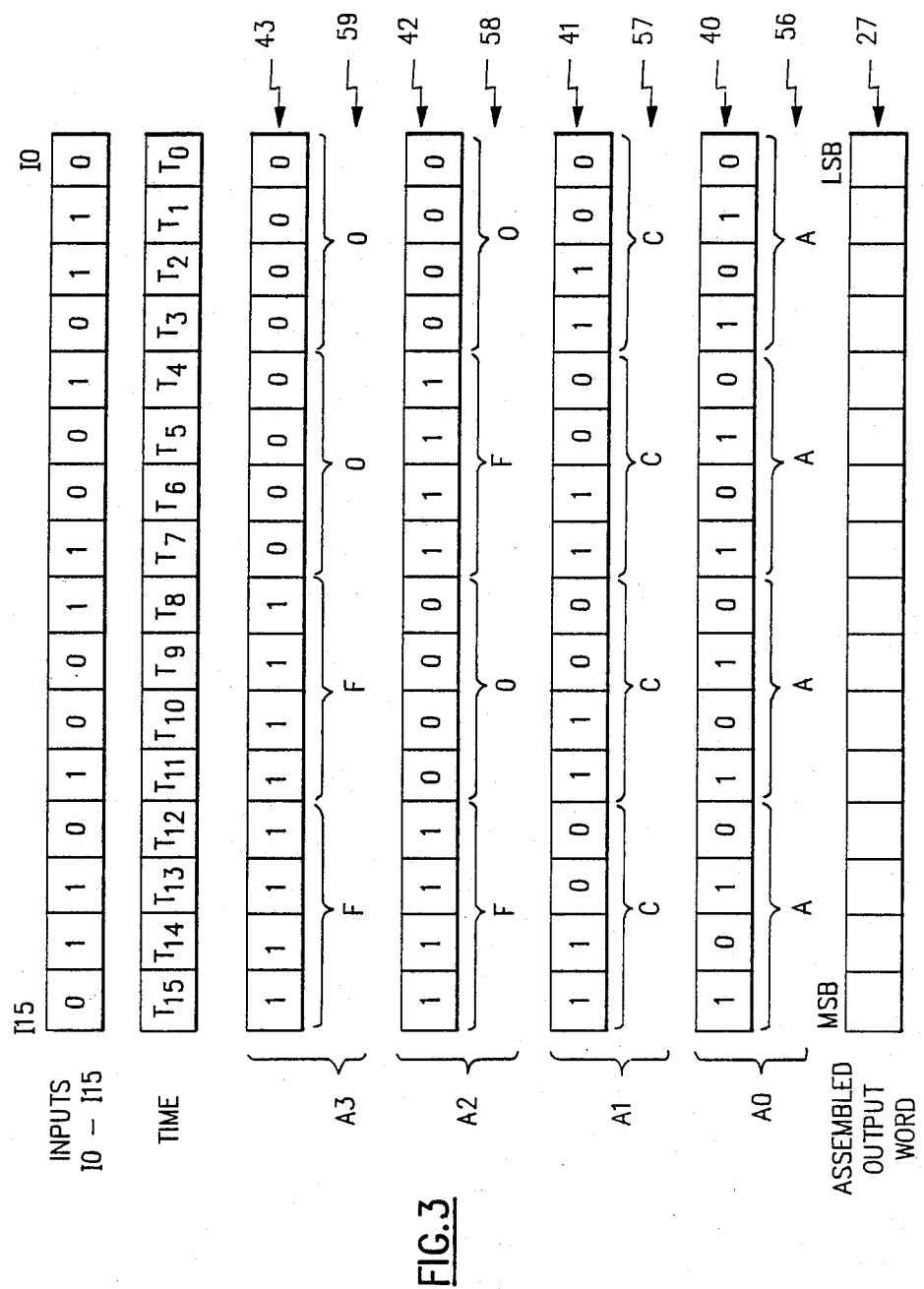
FIG. 3 is a simplified illustration of the binary logic state sequence applied to the address lines of the sixteen input multiplexer of FIG. 1.

Referring to FIG. 3, the address line binary logic states required to address each of the sixteen inputs 24 over a sequence of sixteen time periods T0-T15 are shown in rows 40,41,42,43. Also shown are corresponding hex equivalents in rows 56,5,58,59. A characteristic of the input pattern of the present invention is that if any address lines 22 are always at logic ZERO (i.e., a fault condition where the address line is shorted to zero volts DC), then specific bits in the input pattern, designated by logic ONEs in the affected address line rows 40,41,42,43, will never be selected to appear at the multiplexer output 25. Also, if any address lines 22 are always at logic ONE (i.e., a fault condition where the address line is shorted to +5 volts DC), then specific bits in the input pattern, designated by logic ZEROs in the affected address line rows 40,41,42,43, will never be selected to appear at the multiplxer output 25. Therefore, if the input pattern of 6996 HEX is XOR'ed with the affected address line hex pattern 56,57,58,59, the result is the hex code of the first column 36 of FIG. 2. Then, when this hex code is XOR'ed with the output word 27, a result of all ONES or zero corresponds to specific address line conditions in the second and third columns 37,38.

A first example is that of a first row 62 in FIG. 2. If all address lines 22 are correct, then an input pattern of 6996 HEX reads out of the multiplexer as 6996 HEX, which, when XOR'ed with the first column 36 hex code of 6996 HEX, results in zero. This corresponds to the "address lines correct" entry in the third column 38 of the first row 62. For a signal inversion error, defined as a binary logic state reversal on either the inputs 24, or the output 25, then, for the input pattern of 6996 HEX, the output word 27 will be 9669 HEX. When 9669 HEX is XOR'ed with the hex code of 6996 HEX, the result is all ONEs, which is the diagnostic entry of the second column 37 of the first row 62. In this first example, the hex code of 6996 HEX is inherent to the address line conditions in the second and third columns 37,38 of the first row 62. Thus, the hex code is not determined by the aforementioned XOR operation of 30 the input pattern of 6996 HEX with an affected address line hex pattern 56,57,58,59.

As a second example, assume at logic ONE or logic ZERO, which are the two diagnostic conditions of the second and third columns 37,38 of a second row 64 in FIG. 2. The hex code, C33C HEX, of the first column 36 of the second row 64 is determined by an XOR of the input pattern of 6996 HEX with the A0 address line hex pattern 56 of AAAA HEX. For A0 always at logic ON,, the address lines 22 will not select each of the inputs I0-I15 to appear once at the multiplexer output 25. Instead, the sequence of inputs selected to appear in the output word 27 is: I1 (LSB of output word), I1, I3, I3, I5, I5, I7, I7, I9, I9, I11, I11, I13, I13, I15, I15 (MSB of output word). For an input pattern of 6996 HEX, the resulting output word 27 is 3CC3 HEX. When 3CC3 HEX is XOR'ed with the hex code of C33C, the result is all ONEs. This is the diagnostic entry in the second column 37 of the second row 64 of FIG. 2. If A0 is always at logic ZERO, the sequence of inputs selected to appear at the output will be: I0 (LSB of output word), I0, I2, I2, I4, I4, I6, I6, I8, I8, I10, I10, I12, I12, I14, I14 (MSB of output word). With an input pattern of 6996 HEX, the resulting output word 27 is C33C HEX, which, when XOR'ed with the hex code of C33C, results in zero. This is the diagnostic entry in the third column 38 of the second row 6 of FIG. 2.

In general, to determine the hex codes of the first column 36 of FIG. 2 for problems with a single, given address line (A0 in the above example), the affected address line hex pattern 56,57,58,59 (56 in the above example) is XOR'ed with the input pattern of 6996 HEX. For example, for a sample fault condition where A2 is always at logic ONE or logic ZERO, the input pattern of 6996 HEX is XOR'ed with the A2 hex pattern 58 of F0F0 HEX, which results in 9966 HEX. This hex code is entered into the first column 36 of a fourth row 66 of FIG. 2. Then, for A2 always at logic ONE, when the address lines 22 are sequenced to select I0-I15, the input pattern will not appear in the assembled output word 27 as 6996 HEX, but rather as 6699 HEX. When 6699 HEX is XOR'ed with the hex code of 9966 HEX, the result is all binary ONEs, which corresponds to the diagnostic entry in the second column 37 of the fourth row 66. Other hex codes of the first column 36 of FIG. 2 are determined in a similar manner when a single address line is always at logic ONE or ZERO.

For situations where multiple address lines 22 are shorted either to different logic states or to the same logic state, the hex code entry in the first column 36 is determined by successive XORs between the affected address line hex patterns 56,57,58,59, and then a final XOR of that result with the input pattern. For example, an XOR of the input pattern, 6996 HEX, wit the A0 hex pattern 56, AAAA HEX, and then an XOR of the result with the A1 hex pattern 57, CCCC HEX, results in 0FF0 HEX, which is the hex code in the first column 36 of a sixth row 68 in FIG. 2. When the output word 27 is XOR'ed with 0FF0 HEX, a result of all ONEs indicates that A0 and A1 are shorted to different logic levels, and a result of zero indicates that A0 and A1 are shorted to the same logic level.

For situations where any two address lines 22 are shorted together, the hex code entry in the first column 36 is determined either by an XOR of the unaffected address line hex patterns 56,57,58,59, or by an XOR of the input pattern with the affected address line hex patterns 56,57,58,59. As an example, when A0 and A2 are shorted together, the hex code entry of 33CC HEX in the first column 36 of a seventh row 70 in FIG. 2 is determined either by an XOR of the A1 address line pattern 57, CCCC HEX, with the A3 address line pattern 59, FF00 HEX, or is determined by an XOR of the A0 address line hex pattern, AAAA HEX, with the A2 address line hex pattern, F0F0 HEX, with the result XOR'ed with the input pattern, 6996 HEX. Thus, if A0 and A2 are shorted together, an XOR of the output word 27 with the hex code of 33CC HEX results in zero, which is the diagnostic entry of the third column 38 of the seventh row 70 of FIG. 2. Note, also, that the same hex code, 33CC HEX, is used to diagnose when A0 and A2 are shorted to the same logic level. A diagnostic result of two address lines 22 either being shorted together or to the same logic state occurs for all possible combinations of two address lines.

For situations where any three address lines are shorted together, there are three possibilities: all three address lines will be at logic ZERO (logic ZERO dominates), all three address lines will be at logic ONE (logic ONE dominates), or the majority logic state dominates (wins). For logic ZERO domination, the hex code of column one 36 is generated by successive logical AND operations between the affected address line hex patterns 56,57,58,59, and the result is XOR'ed with the unaffected address line pattern 56,57,58,59. As an example of A0-A2 shorted together and logic ZERO dominates, the A0 hex pattern 56 of AAAA HEX is AND'ed with the A1 hex pattern 57 of CCCC HEX, the result is AND'ed with the A2 hex pattern 58 of F0F0, and this result is XOR'ed with the A3 hex pattern 59 of FF00 HEX. The result is 7F80 HEX. If A0-A2 are shorted together and logic ZERO dominates, then the input pattern of 6996 HEX read out of the multiplexer is 7F80 HEX, which, when XOR'ed with the hex code of 7F80 HEX, results in zero. This is a diagnostic entry in the third column 38 of a row 71 in FIG. 2. For logic ONE domination, the affected address line patterns 56,57,58,59 are logically OR'ed together in succession, and the esult is XOR'ed with the unaffected address line pattern 56,57,58,59. As an example where A0-A2 are shorted together and logic ONE dominates, the A0 hex pattern 56 is OR'ed with the A1 hex pattern 57, the result is OR'ed with the A2 hex pattern 88, and this result is XOR'ed with the A3 hex pattern 59. The result is 01FE HEX. If A0-A2 are shorted together and logic ONE dominates, then the input pattern of 6996 HEX read out of the multiplexer is 01FE HEX, which, when XOR'ed with the hex code of 01FE HEX, results in zero. This is a diagnostic entry in the third column 38 of a row 72 in FIG. 2. For majority level domination, the affeted address line patterns 56,57,58,59 undergo a sum of products operation, and the result is XOR'ed with the unaffected address line patterns 56,57,58,59. As an example whefe A0-A2 are shorted together and the majority state dominates, the A0 hex pattern 56 is AND'ed with the A1 hex pattern 57, the result is OR'ed with the result of an AND operation between the A0 hex pattern 56 and the A2 hex pattern 58, the result is OR'ed with the result of an AND operation between the A1 hex pattern 57 and the A2 hex pattern 58, then the result is XOR'ed with the A3 hex pattern 59. The total result is 17E8 HEX. If A0-A2 are shorted together and the majority state dominates, then the input pattern of 6996 HEX read out of the multiplexer is 17E8 HEX, which, when XOR'ed with the hex code of 17E8 HEX, results in zero. This is a diagnostic entry in the third column 38 of a row 73 in FIG. 2.

In general, any problem situations in which an odd number of address lines are shorted to logic ONE belong to the group listed in the second column 37 of FIG. 2, and any problem situations where an even number (including zero) of address lines are shorted to logic ONE belong to the group listed in the third column 38 of FIG. 2.

An entry in a last row 75 in the first column 36 corresponds to a multiplexer error, such as an open input line, that can be caught but not fully diagnosed. Hence, a hex code other than those of the previous rows of the first column 36 is entered in the first column 36 of the last row 75.

Figure 4:
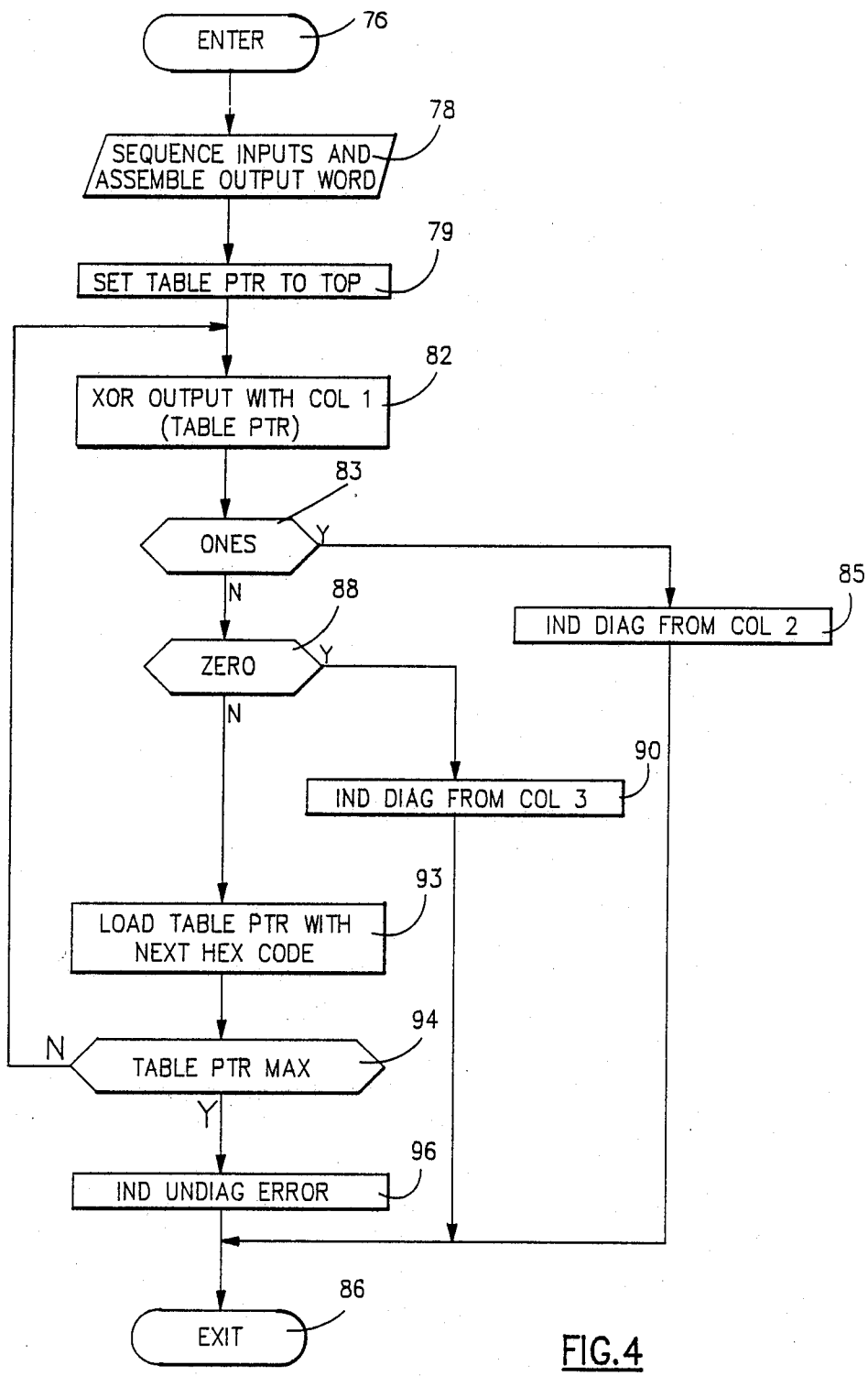
FIG. 4 is a flowchart diagram illustrating the steps taken by a host computer in executing the multiplexer test of the present invention.

FIG. 4 is a flowchart illustrating a program of steps executed by a system that is testing the address lines 22 of the sixteen input multiplexer 20 using the input patterns of the present invention. For example, assume the multiplexer 20 is installed in an electronic system, along with other components, and the system is undergoing testing by a host computer before being delivered to the customer. The flowchart, along with the table of FIG. 2, is coded in software and executed by the host computer. Beginning after an enter step 76 in FIG. 4, each of the sixteen multiplexer inputs 24 is selected in sequence in a series of subroutine steps 78 using the address lines 22. I0, corresponding to address lines A0-A3 all equal to logic ZERO, is selected first, followed by I1, I2, etc. . . , up through I15. As the address 22 lines are sequenced, the multiplexer output 25 at each sequence is assembled into the sixteen bit output word 27 in the same step 78 for use in this routine. In a next step 79, a table pointer register is loaded with 6996 HEX, which is the hex code of the first column 36 of the first row 62 of FIG. 2. The multiplexer output word 27 is then XOR'ed with the table pointer in a step 82. Next, a test 83 determines whether the result is all ONEs. If so, the routine has diagnosed a problem with the multiplexer address lines 22 and the diagnosis is indicated from the second column 337 of FIG. 2 in a step 85. For the table pointer value of 6996 HEX, an XOR result of all ONEs indicates a signal inversion error, defined as either all the inputs 24, or the output 25 being reversed in logic states. The host computer then exits the routine in a step 86. If the result of the test 83 is such that the result of the XOR is not all ONEs, a test 88 determines whether the result of the XOR is zero. If so, the routine indicates the diagnosis from the third column 38 of FIG. 2 in a step 90. For the table pointer value of 6996 HEX, an XOR result of zero indicates the address lines 22 are correct. (Note that any other entry in the third column 38 indicates a problem with the address lies 22). The routine then exits in the step 86. If the result of the test 88 is such that the result of the XOR is not zero, the table pointer is loaded with the next hex code in the first column 36 in a step 93. A step 94 then tests whether the table pointer contains the last hex code in the first column 36. If so, then the routine indicates, in a step 96, an undiagnosed multiplexer problem such as a faulty input. The routine then exits in the step 86. If the result of the test 94 is such that the table pointer does not contain the last hex code in the first column 36, then the routine branches back to the step 82. There, the multiplexer output word 27 is again XOR'ed with the table pointer hex code. The second time the step 82 is executed, the table pointer contains the hex code (C33C) in the second row 64 of the first column 36. The routine again tests, in the steps 83,88, whether the result of the XOR is either all ONEs or zero, and if so, the appropriate diagnosis from eiter the second or third columns 37,38 of FIG. 2 is indicated and the routine exits. If the result is not either all ONEs or zero, the table pointer is loaded with the next hex code from the first column 36 in a step 93. The routine then continues until either a problem diagnosis has been made or all the hex codes in the first column 36 have been exhausted and an indication of an undiagnosed error is given in the step 96.

Although the invention has been shown as implemented on a sixteen input multiplexer, multiplexers having another number (N) of inputs may be tested by the present invention. Of course, for use with a multiplexer with another number of inputs, another number (M) of address lines is required. As examples, for use with an eight input multiplexer, three address lines are required; for a 32 input multiplexer, five address lines are required. Also, as shown, the multiplexer is digital in nature, i.e., the inputs and output are made to electrically interface with binary logic signals, such as the well-known TTL non return to zero (NRZ) signals. Of course, the invention could be used to test devices that use other types of digital signals, such as the well-known CMOS signals. The invention could also be used on other types of multiplexers. For example, for use with an analog multiplexer, it is necessary to assign one of the binary logic states (e.g., ZERO) to the condition where the analog inputs, as well as the analog output, are below a certain value, and to assign the other binary logic state (e.g., ONE) to the condition where the analog inputs and the analog output re above a certain value; as so assigned, low values are deemed to be binary ZEROs and high values are deemed to be binary ONEs. Also, the invention has been described for use with electronic multiplexers, such as the well-known digital multiplexer, for ease of understanding the concepts of the invention. However, the invention could be used with other types of multiplexers, such as optical, in an appropriate fashion which should be readily apparent to those skilled in the art in the light of the foregoing description. Also, the multiplexer is not necessarily constrained to be tested by the present invention only after it is installed in its intended implementation. The multiplexer an be tested while not a part of any system (i.e., in a stand alone configuration as part of a component test).

As shown, the flowchart and table of the multiplexer test of the present invention are coded in software that is executed by a host computer as part of an acceptance test. Of course, the software code of the flowchart and table could reside in a microprocessor based system which runs the multiplexer test of the present invention at repeated intervals during operation of the system while in its intended environment.

The time division multiplexer output word 27, as shown, undergoes XOR operations with a series of hex codes before indicating problems with the multiplexer address lines 22. However, wit the input pattern of the present invention, the output word is sufficiently unique so that a type of direct table lookup scheme may be implemented that does not require either the hex codes of the first column 36 of FIG. 1, or, thus, the subsequent series of XOR operations of the hex codes with the output word 27. As examples, an output word 27 of 6996 HEX would reach an address in the table with the diagnostic message of "all address lines 22 correct" (as in the third column 38 of the first row 62 of FIG. 2); the complement of 6996 HEX, 9669 HEX, would reach an address with the diagnostic message of "signal inversion" (as in the second column 37 of the first row 62); an output word 27 of C33C HEX would reach an address with the diagnostic message "A0 always at logic ZERO (low)" (as in the third column 38 of the second row 64); the complement of C33C HEX, 3CC3 HEX, would reach an address with the diagnostic message "A0 always at logic ONE (high)" (as in the second column 37 of the second row 64); ... and an output word 27 of all ONEs would reach an address with the diagnostic message "A0–A3 all shorted high or low" (as in the penultimate row of the third column 38). Also, any output word which is not shown in the first column 36 and is not the complement of one shown in the first column 36 would reach in address in the table with the diagnostic message "undiagnosed error". Similarly, all undiagnosed error entries in the second column 37 which correspond to the complement of an entry in the first column 36 (such as C993 HEX, the complement of 366C HEX in the last row in FIG. 2B) would reach an address in the table with the diagnostic message "undiagnosed error". Further, any method can be used to relate the output word to the sets of predetermined diagnostic words to determine the diagnostic results.

As shown, the input pattern used in the exemplary embodiment is 6996 HEX. However, the invention is not constrained to use this as the sole input pattern. An input pattern of 9669 HEX would provide similar diagnostic capability. Of course, for use with an input pattern of 9669 HEX, the hex codes of the first column 36 of FIG. 2 are the complement of those enumerated in the first column 36 of FIG. 2. All of the foregoing changes and variations are irrelevant to the invention, it suffices that the pattern of binary logic ONEs and ZEROs applied to the inputs of the multiplexer be such that the pattern read out of the multiplexer is different from the input pattern in such a way as to indicate particular multiplexer address line conditions.

Although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. A method for testing a multiplex, comprising:
applying to the data inputs (inputs) of said multiplexer binary logic states (ONE, ZERO) in a pattern characterized by a reversal of said binary logic states at input boundaries defined numerically as radix two raised to successive integer exponents, said integer exponents beginning with zero and increasing positively by one;
next, applying binary logic states to address lines of said multiplexer in a desired sequence to select each of said inputs of said multiplexer in a desired sequence to appear at an output of said multiplexer, said desired input sequence beginning with a first input of said multiplexer and ending with a last (Nth) input of said multiplexer, and assembling the binary logic states that appear at said output during successive steps of said address line sequence into an N bit output work, said output word uniquely identifying one of a number of particular applicable diagnostic conditions, said diagnostic conditions including that all address lines operate properly, that a specified single address line has a particular fault, that a set of address lines has one of a number of faults per address line in the set, and that the fault is not diagnosed.

2. A method for testing a multiplexer, according to claim 1, further comprising:
EXCLUSIVE-OR'ing said output word of said multiplexer with preselected codes to provide indication of said particular diagnostic conditions.

3. A method for testing a multiplexer, according to claim 2, further comprising:
determining said preselected codes for address line fault conditions where, during said address line sequence,:
an odd number of said address lines are at logic ONE; or,
an even number (including zero) of said address lines are at logic ONE; by:
EXCLUSIVE-OR'ing said input pattern with said desired binary logic states applied during said address line sequence to any one of said odd number or said even number of said address lines;
next, successively EXCLUSIVE-OR'ing the result of a previous EXCLUSIVE-OR with said desired binary logic states applied during said address line sequence to any remaining ones of said odd number or said even number of said address lines.

4. A method for testing a multiplexer, according to claim 3, further comprising:
determining said preselected codes for address line fault conditions where, during said address line sequence,:
any two of said address lines are both at logic ONE; or,
any two of said address lines are both at logic ZERO; or,
any two of said address lines are shorted together; or
any one of said any two address lines is either at logic ONE or ZERO and the other of said any two address lines is at the opposite logic state from that of said any one address line; by:
EXCLUSIVE-OR'ing said desired binary logic states applied during said address line sequence to said any two address lines;
next, EXCLUSIVE-OR'ing the result with said input pattern.

5. A method for testing a multiplexer, according to claim 3, further comprising:
determining said preselected codes for address line fault conditions where, during said address line sequence,:
any three of said address lines are at logic ONE; or,
any three of said address lines are at logic ZERO; or,
any one of said any three address lines is either at logic ONE or ZERO and the other two of said any three address lines are at the opposite logic state from that of said any one address line; by:
EXCLUSIVE-OR'ing said desired binary logic states applied during said address line sequence to any two of said any three address lines;
next, EXCLUSIVE-OR'ing the result with said desired binary logic states applied during said address line sequence to a third of said any three address lines;
next, EXCLUSIVE-OR'ing the result with said input pattern.

6. A method for testing a multiplexer, according to claim 3, further comprising:
determining said preselected codes for address line fault conditions where, during said address line sequence,:
all of said address lines are at logic ONE; or,
all of said address lines are at logic ZERO; by:
EXCLUSIVE-OR'ing said input pattern and said desired binary logic states applied during said address line sequence to any one of said address lines;
next, EXCLUSIVE-OR'ing the result with said desired binary logic states applied during said address line sequence to a second of said address lines;
next, successively EXCLUSIVE-OR'ing the result of a previous EXCLUSIVE-OR with said desired binary logic states applied during said address line sequence to any remaining ones of said address lines.

7. A method for testing a multiplexer, according to claim 2, further comprising:
determining said preselected codes for address line fault conditions where, during said address line sequence,:
any single address line is at logic ONE; or,
any single address line is at logic ZERO;
by EXCLUSIVE-OR'ing said input pattern with said desired binary logic states applied during said address line sequence to said any single address line.

8. A method for testing a multiplexer, according to claim 2, further comprising:
determining said preselected codes for fault conditions where three of said address lines are shorted together, with the result that said three shorted address lines are all at logic ZERO during said address line sequence, by:
AND'ing said desired binary logic states applied during said address line sequence to any two of said three shorted address lines;
next, AND'ing the result with said desired binary logic states applied during said address line sequence to a third of said three shorted address lines;
next, EXCLUSIVE-OR'ing the result with said desired binary logic states applied during said address line sequence to any other address lines which are not one of said three shorted address lines;
next, successively EXCLUSIVE-OR'ing the result of a previous EXCLUSIVE-OR with said desired binary logic states applied during said address line sequence to any remaining ones of said other address lines.

9. A method for testing a multiplexer, according to claim 2, further comprising:
determining said preselected codes for fault conditions where three of said address lines are shorted together, with the result that said three shorted address lines are all at logic ONE during said address line sequence, by:
EXCLUSIVE-OR'ing said desired binary logic states applied during said address line sequence to any two of said three shorted address lines;
next, EXCLUSIVE-OR'ing the result with said desired binary logic states applied during said address line sequence to a third of said three shorted address lines;

next, EXCLUSIVE-OR'ing the result with said desired binary logic states applied during said address line sequence to any other address lines which are not one of said three shorted address lines;

next, successively EXCLUSIVE-OR'ing the result of a previous EXCLUSIVE-OR with said desired binary logic states applied during said address line sequence to any remaining ones of said other address lines.

10. A method for testing a multiplexer, according to claim 2, further comprising:

determining said preselected codes for address line fault conditions where three of said address lines are shorted together, with the result that said three shorted address lines are all at a binary logic state determined by the majority number of either binary ONEs or ZEROs applied during said address line sequence to said three shorted address lines, by:

a logic sum of products operation of said desired binary logic states applied during said address line sequence to said three shorted address lines;

next, EXCLUSIVE-OR'ing the result with said desired binary logic states applied during said address line sequence to any of said address lines other than said three shorted address lines;

next, successively EXCLUSIVE-OR'ing the result of a previous EXCLUSIVE-OR with said desired binary logic states applied during said address line sequence to any remaining ones of said other address lines.

11. A method for testing a multiplexer, according to claim 2, further comprising:

transmitting one of a number of particular applicable diagnostic conditions when a result of one of said EXCLUSIVE-OR logic operations between said output word and said preselected codes is all binary ONEs.

12. A method for testing a multiplexer, according to claim 1, further comprising:

transmitting one of a number of particular applicable diagnostic conditions when a result of one of said EXCLUSIVE-OR logic operations between said output word and said preselected codes is zero.

13. A method for testing a multiplexer, according to claim 2, further comprising:

transmitting an undiagnosed error condition when each result of said series of EXCLUSIVE-OR logic operations is not all ONEs and not all ZEROs.

14. A method for testing a multiplexer, according to claim 1, further comprising:

applying said output word as an address to a table of said diagnostic conditions of said address lines of said multiplxer to provide diagnostic messages identifying said particular diagnostic conditions.

15. In a method for texting a multiplexer, which includes applying binary signals to inputs of said multiplexer, applying binary signals to address lines of said multiplexer in a desired address sequence to select the corresponding one of said binary signals on each of said inputs in a desired input sequence to appear at an output of said multiplexer, said desired input sequence beginning with a first input and ending with a last (Nth) input, assembling each said binary signal at said output during said desired input sequence into an N bit output word, and examining said N bit output word, the step of:

applying said binary signals to said inputs in a pattern characterized by a reversal of said binary signals at input boundaries defined numerically as radix two raised to successive integer exponents, said interger exponents beginning with zero and increasing positively by one, whereby said N bit output word uniquely identifies one of a number of particular diagnostic conditions of said multiplexer, said conditions including that all of said address lines operate properly, that a specified one of said address lines has a particular fault, that a set of said address lines has one of a number of faults per address line in the set, and that the fault is not diagnosed.

* * * * *